United States Patent [19]

Wallmeier

[11] Patent Number: 5,748,614
[45] Date of Patent: May 5, 1998

[54] METHOD FOR SCHEDULING MESSAGE CELLS LEAVING AN ATM NODE

[75] Inventor: Eugen Wallmeier, Eichenau, Germany

[73] Assignee: Siemens Aktiengesellschaft, Munich, Germany

[21] Appl. No.: 659,313

[22] Filed: Jun. 6, 1996

[30] Foreign Application Priority Data

Jun. 9, 1995 [EP] European Pat. Off. .............. 95108916

[51] Int. Cl.$^6$ ........................... H04Q 11/04; H04L 12/56
[52] U.S. Cl. ........................ 370/235; 370/395; 370/412
[58] Field of Search .................................. 370/235, 229, 370/412, 414, 418, 230, 468, 428, 433, 395, 252, 253, 396, 397; 395/200.65

[56] References Cited

U.S. PATENT DOCUMENTS

| | | | |
|---|---|---|---|
| 5,050,161 | 9/1991 | Golestani | 370/396 |
| 5,150,358 | 9/1992 | Punj et al. | 370/412 |
| 5,166,930 | 11/1992 | Braff et al. | 370/235 |
| 5,392,280 | 2/1995 | Zheng | 370/231 |
| 5,521,923 | 5/1996 | Willmann et al. | 370/412 |
| 5,533,020 | 7/1996 | Byrn et al. | 370/412 |
| 5,561,663 | 10/1996 | Klausmeier | 370/412 |

Primary Examiner—Douglas W. Olms
Assistant Examiner—Chau T. Nguyen
Attorney, Agent, or Firm—Hill & Simpson

[57] ABSTRACT

A method for scheduling message cells leaving an ATM node and belonging to virtual connections by means of an output controller allocated to each of the outputs of the ATM node is provided. Message cells to be transmitted via the respective output are stored in connection individual FIFO-queues. Two variables Ti, Si are allocated to each of the FIFO-queues, where Ti defines the distance between consecutive message cells of a virtual connection i served at the rate ri=1/Ti, and TSi denotes a time stamp for the message cell at the head of the FIFO-queue. A virtual time variable VT is provided. The peak cell rate is monitored individually for each of the virtual connections at the egress of the respective output controller. The FIFO-queue with the lowest time stamp serves for transmitting the message cell at the head of that FIFO-queue only when VT>TSi and the peak cell rate for the respective virtual connection is not exceeded. The time stamp for that FIFO-queue is updated if it is not empty with TSi←TSi+Ti after transmitting the message cell.

1 Claim, 2 Drawing Sheets

5,748,614

METHOD FOR SCHEDULING MESSAGE CELLS LEAVING AN ATM NODE

BACKGROUND OF THE INVENTION

The invention relates to a method for scheduling message cells leaving an ATM node and belonging to virtual connections by means of an output controller allocated to each of the outputs of the ATM node.

SUMMARY OF THE INVENTION

It is an object of the present invention to specify a scheduling procedure which allows a shaping of peak cell rates.

According to the method of the invention for scheduling message cells leaving an ATM node and belonging to virtual connections by means of an output controller allocated to each of outputs of the ATM node, message cells to be transmitted via a respective output are stored in connection individual FIFO-queues. Two variables Ti, TSi are allocated to each of the FIFO-queues, where Ti defines a distance between consecutive message cells of a virtual connection i served at a rate ri=1/Ti, and TSi denotes a time stamp for a message cell at a head of a FIFO-queue i. A virtual time variable VT is provided. Peak cell rate is individually monitored for each of the virtual connections at an egress of the respective output controller. The FIFO-queue with a lowest time stamp for transmitting the message cell at the head of that FIFO-queue is served only when VT≧TSi and the peak cell rate for the respective virtual connection is not exceeded. The time stamp for the FIFO-queue is updated if it is not empty with TSi←TSi+Ti after transmitting the message cell.

DESCRIPTION OF THE PREFERRED EMBODIMENTS

ATM modes have to support a variety of services with different traffic characteristics and Quality of Service (QOS) requirements. The ATM Forum has defined the following five traffic classes (ATM Forum, Traffic Management Specification, Version 4.0, ATMF 95-0013R2, 15 Apr. 1995):

CBR—constant bit rate

VBR-RT—variable bit rate-real time

VBR-NRT—variable bit rate-non-real time

ABR—available bit rate. Also known as Class-Y in ITU-T

UBR—unspecified bit rate.

Large buffers and sophisticated buffer management functions are needed to support all these traffic classes in an integrated fashion within one node.

Figure 1:
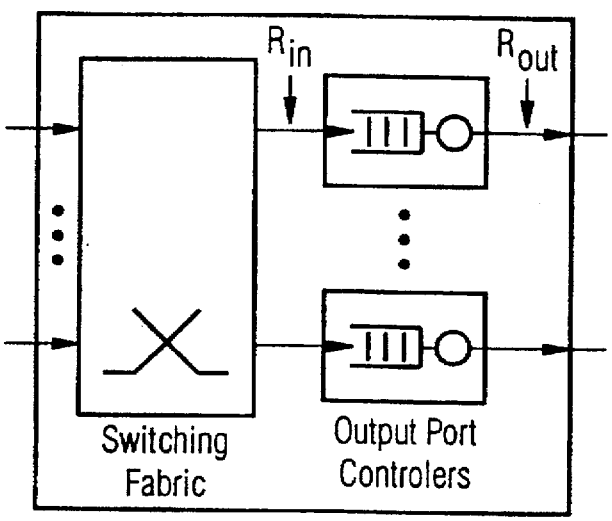
FIG. 1 is an illustration of a switching fabric and output port controllers for explaining cell scheduling algorithms in a node.

The specific requirements for a cell scheduling algorithm in a node with large buffers depend on the node architecture. The basis for the following discussion of cell scheduling algorithms in a node is depicted in FIG. 1. This is an output buffered node with a bottleneck-free switching fabric. It is assumed that the throughput of the switching network and the bandwidth at the inputs of the output controller (corresponding to a cell rate Rin) is so high that there is no internal bandwidth contention. Resource management is limited to the contention for the output link bandwidth and for buffer space in the output port controller. In this system, cell scheduling algorithms would be located in the output port controllers.

In most ATM systems currently deployed the cell buffers are served on a FIFO (first in first out) basis. For ATM systems with large buffers (e.g. some Mbytes per output queue) FIFO queuing is not adequate for various reasons. Before discussing the requirements for cell scheduling algorithms in such systems some crucial problems with FIFO queuing are summarized. In analyzing the requirements for the cell scheduling function, three different items are to be distinguished: fairness, isolation and egress shaping functionalities.

The traffic characteristics negotiated at call set up and monitored at the network edge by the UPC function, e.g. the Peak Cell Rate or the Sustainable Cell Rate of a connection, may be changed drastically when connections' cell streams pass large buffers served in a FIFO manner. In an ATM network with large buffers and simple FIFO queuing, the connection Admission Control (CAC) functions cannot rely on parameters declared by the sources. This makes efficient traffic management very difficult.

Moreover, many studies performed during the last years (see e.g. H. Kröner, 'Statistical Multiplexing of Sporadic Sources—Exact and Approximate Performance Analysis', in: Teletraffic and Datatraffic in a Period of Change, ITC-13, A. Jensen and V. B. Iversen (editors), 1991) show that the performance of a statistical multiplexer with a large buffer served in a FIFO manner is very sensitive to the traffic characteristics of the offered load. Cell loss and cell delay in such a multiplexer are strongly dependent on traffic parameters, like the burst length distribution of the arriving traffic, which are very difficult to specify in advance or to police. The traffic parameters defined by the ATM-Forum (Peak Cell Rate, CDV-tolerance, Sustainable Cell Rate, and Maximum Burst Size) are not sufficient to define a robust CAC strategy for systems with large buffers and FIFO queuing.

Another problem of such systems is fairness. FIFO queuing cannot support fairness because it shares the bandwidth of a link between different connections according to the amount of arriving traffic. Even if no cell loss will occur, the cell delay variation experienced by individual connections may be intolerable and cause applications to fail.

Figure 2:
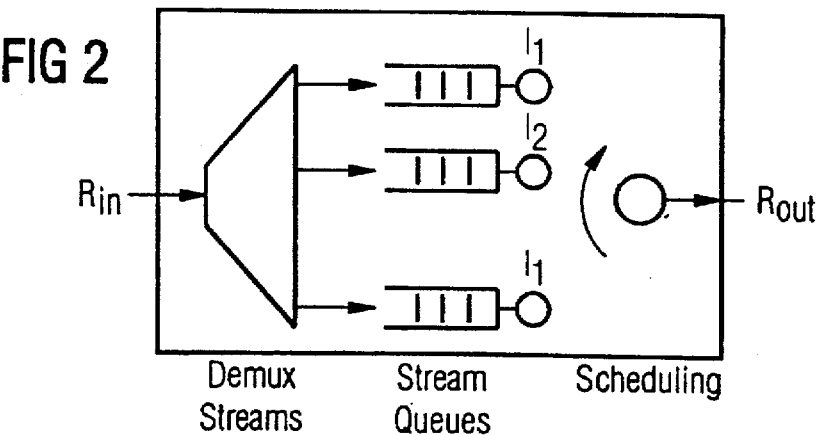
FIG. 2 is an illustration of a conceptual model of an output controller based on Weighted Fair Queuing.

A cell scheduling algorithm serving a large buffer should distribute the available transmission bandwidth among the different connections in a fair way. There are various ways to define fairness. In the ATM Forum, supra, five different definitions can be found. Closely related to fairness is the concept of "isolation". A scheduling mechanism should guarantee that a badly behaving source cannot grab bandwidth from well behaving sources. Or in other words, a source which does not conform to the rules agreed with the network, should be isolated. "Weighted Fair Queuing (WFQ)" is one way to define a fair scheduling scheme providing isolation. In a WFQ scheduler, each connection (or more generally each data stream) is given a rate parameter (ri is the rate parameter of stream i) which identifies the streams' relative weights in the allocation of link bandwidth. Each backlogged stream (i.e. a stream which has data to send) is allocated an amount of the link bandwidth in proportion to its rate parameter. When the sum of the rate parameters is below the transmission capacity, each connection is served at least at its rate ri. FIG. 2 shows a conceptual model of an output controller based on Weighted Fair Queuing.

WFQ is an ideal which cannot be reached in practice. It is exactly defined only for fluid systems which are also denoted as General Processor Sharing (GPS) systems. Parekh and Gallager (A. Parekh and R. Gallager, 'A Generalized Processor Sharing Approach to Flow Control in Integrated Services Networks: The Single Node Case', INFOCOM '92, 1992) have described an algorithm, denoted as Packet by Packet General Processor Sharing (PGPS), which approximates the ideal as exact as possible in an environment using variable length packets. In J. W. Roberts, 'Virtual Spacing for Flexible Traffic Control', Int. J. Of communications systems, Vol. 7, 307-318 (1994), it is summarized how this algorithm would work in an ATM environment.

The algorithm uses the notion of virtual time. The virtual time V(t) evolves at a rate inversely proportional to the sum of the weight factors of all backlogged connections in the corresponding "generalized processor sharing system". Let TSi be a variable associated with connection i, denoted as a time stamp. The algorithm operates as follows:

1) When a cell arrives for connection i then
   a) TSi←max{V(t), TSi}+1/ri
   b) Time-stamp the cell with the value of TSi
2) Serve packets in increasing order of time stamp.

In practice it is hardly possible to implement this algorithm, since it is very difficult to keep track of the virtual time in a generalized processor sharing system. For the implementation of an algorithm approximating WFQ, further simplifications are needed.

A cell scheduling function determines the traffic characteristics of a connection's stream leaving the output controller; this means a cell scheduling function performs "egress shaping". It is not obvious which traffic characteristics should be under control on a link interconnecting two ATM nodes with large buffers. One could argue that the cell scheduling algorithm should strictly control all traffic parameters which are specified at the NNI, i.e. Peak Cell Rate (together with Cell Delay Variation Tolerance), Sustainable Cell Rate and Maximum Burst Size. However, this approach has various problems:

a) Which traffic parameters have to be shaped between two nodes depends on the traffic management functions, in particular on the CAC mechanism, used in the network. It is not clear how the parameter set consisting of Peak Cell Rate, Sustainable Cell Rate and Maximum Burst Size can be used to define a CAC mechanism adequate for systems with large buffers.

b) Shaping a cell flow such that it matches a given Peak Cell Rate means to introduce cell delays.

In J. W. Roberts, supra, a traffic management concept for ATM systems with large buffers is presented which takes into account the problems addressed above. The key idea of this approach is the following.

Consider an ATM network consisting of nodes with large buffers. Assume that the Sustainable Cell Rate and the Maximum Burst Size of every connection are monitored at the network edge using the Generic Cell Rate algorithm (GCRA) (see ATM-Forum, supra) which is equivalent to a Continuous State Leaky Bucket. Let ri denote the drain rate of the Leaky Bucket monitoring connection i (measured in cells per second). Let Mi denote its size (measured in cells). When every node guarantees that each active connection is always served at least with a minimum service rate equal to its Sustainable Cell Rate ri then the amount of data which can be accumulated for one connection in the network (possibly within one node) is limited i Neglecting the effects of cell level fluctuations, i.e. considering a fluid model, one concludes that the amount of cells to be stored for connection i is at most Mi.

Using this procedure, neglecting cell level fluctuations, loss-free statistical multiplexing of VBR-NRT traffic can be achieved. With Roberts' approach the traffic parameters defined in ATM-Forum, supra, like Peak cell Rate, Sustainable Cell Rate etc. are not explicitly shaped or controlled at the egress of the node. Instead, the cell scheduling algorithm has to satisfy the challenging requirement that every backlogged connection (i.e. every connection that has data to send) is always served at least with its Sustainable Cell Rate. There are various approaches to guarantee minimum service rates. In the following two of them are considered: "Weighted Fair Queuing (WFQ)" as defined above guarantees that every backlogged stream is always served at its rate ri. Another scheduling algorithm which can guarantee minimum rates is the Virtualclock Algorithm in L. Zhang, 'Virtualclock—A New Traffic Control Algorithm for Packet Switching Networks', ACM SIGCOM '90, 1990.

Most of the ATM switches currently deployed have only small buffers which are dimensioned to cope with cell delay variation which may occur in a network applying Peak Cell Rate Reservation. A typical size of a cell buffer dedicated to an output of a switch is around 100 ATM cells. In the following, the requirements for the cell scheduling function located in an output controller of a system with a large buffer feeding an interworking link which leads to a system with a small buffer are discussed.

Figure 3:
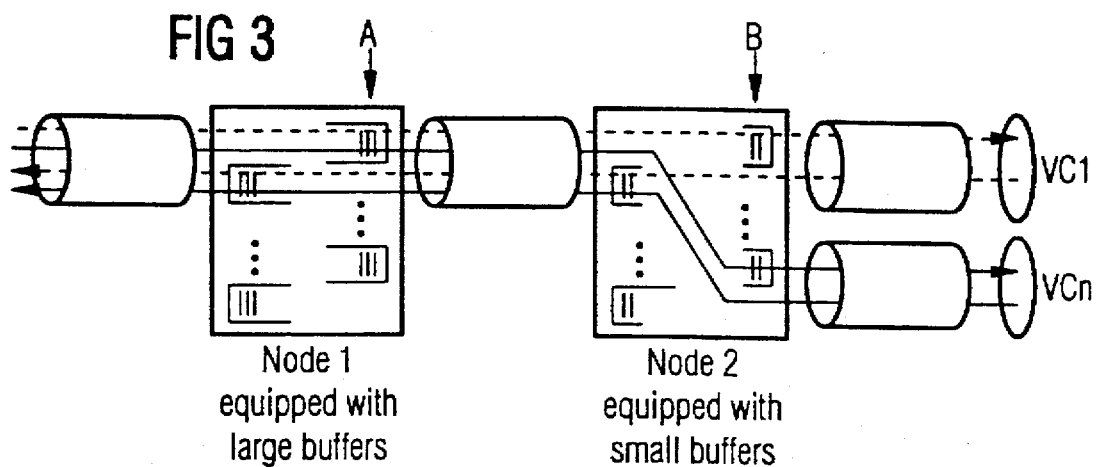
FIG. 3 shows interworking between a node with large buffers and a node with small buffers.

FIG. 3 shows the Interworking between a node with large buffers and a node with small buffers.

The cell scheduling algorithm at point A of FIG. 3 determines which Connection Admission Control (CAC) function can be used on the links leaving node 2 (at point). The scheduling algorithm at A has to reshape the peak cell rates of individual VPCs or VCCs so that node 2 can switch VPCs and/or VCCs, respectively, and use Peak Cell Rate Reservation.

An ATM node with small buffers may support statistical multiplexing of VBR connections which have a peak cell rate that is small compared to the link rate (say less than 5% of the link rate). Statistical multiplexing of such connections is possible on the basis of a connection's peak cell rate and its sustainable cell rate, e.g. with the CAC algorithm "Sigma-Rule" (E. Wallmeier, C. Hauber, 'Blocking Probabilities in ATM-Pipes controlled by a Connection Acceptance Algorithm Based on Mean and Peak Bit Rates, in: Queuing, Performance and Control in ATM, ITC-13, J. W. Cohen, C. D. Pack, Editors, 1991; see also The Spacing Policer an Algorithm for Efficient Peak Bit Rates Control in ATM Networks, XIV ISS, Paper A5.5, Yokohama 1992. Such a CC procedure can be used at point B only, when the cell scheduling function at point A shapes the traffic in a way that the Peak Cell Rates and Sustainable Cell Rates of VBR connections with low peak rates are under control at point A. A control of the Sustainable Cell Rates of VBR-NRT connections at point A is also needed for buffer dimensioning in node 1. When each active VBR-NRT connection is always served at least at its Sustainable Cell Rate, then the Roberts' approach described above can be used to dimension the buffers in node 1 for loss free switching of VBR-NRT traffic.

Figure 4:
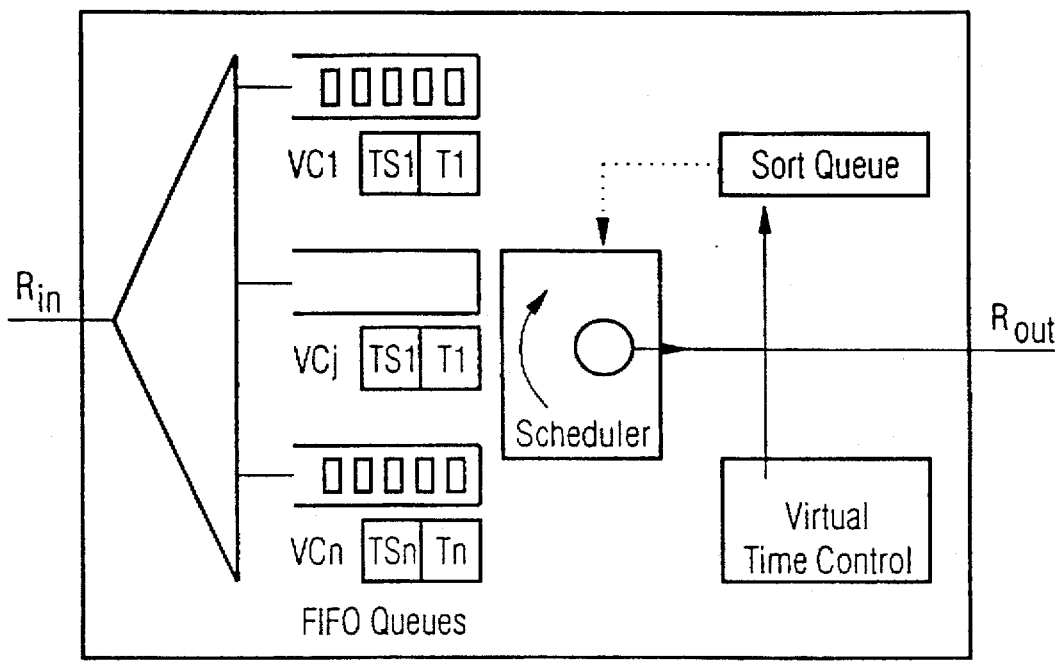
FIG. 4 illustrates a preferred embodiment of a related output controller.

In the following, a generic architecture for a cell scheduling function are discussed. FIG. 4 shows a preferred embodiment of the related output controller.

This embodiment is a generalization of conceptual models described in J. W. Roberts, supra, S. J. Golestani, 'A Self-Clocked Fair Queuing Scheme for Broadband Applications', INFOCOM '94, July 1994) and J. W. Roberts, P. E. Boyer, M. J. Servel, 'A Real Time Sorter With Application to ATM traffic Control', ISS 1995, Berlin, April 19915. Using various definitions for the virtual time control one can implement a variety of fair scheduling algorithms including the Virtual Spacing Algorithm described in J. W. Roberts, supra, and S. J. Galestani, the Virtualclock algorithm presented in L. Zhang, supra and a fair scheduling algorithm limiting peak cell rates of individual connections.

In the output controller arriving cells are stored in connection individual FIFO-queues (In a preferred embodiment, only addresses of the arriving cells are stored in these queues, and the cells themselves would be stored in a separate memory). Associated with each FIFO there are two variables (real numbers): Ti is the inverse of the rate parameter ri of connection i and defines the distance between consecutive cells of a connection served at the rate ri. In a typical application Ti will be equal to the inverse of a connection's Peak Cell Rate or Sustainable Cell Rate. TSi denotes a time stamp for the cell at the head of the FIFO queue i.

A sort queue and a block called "Virtual Time Control" are used to decide when and in which sequence the FIFOs are served.

The sort queue holds for every non-empty (i.e. backlogged) FIFO queue, one entry containing a "queue identifier (QID)" (e.g. the number of the queue) and the associated time stamp TSi. The FIFO queues are served in the order of increasing time stamps. The cell scheduler uses the sort queue to find the FIFO queue with the lowest time stamp.

The Virtual Time Control provides a variable VT which is a non-decreasing function of time. The rate at which the virtual time VT evolves depends on the application of the scheduling algorithm. It may evolve at a constant rate or evolve dynamically, e.g. if the system is used for Virtual Spacing. In the following it will be explained in detail how VT evolves depending on the application. The FIFO queue with the lowest time stamp (assume FIFO i) is served (this means the QID is given to the Scheduler) when the virtual time VT held by the Virtual Time Control has reached the value of the time stamp, i.e. when VT>TSi.

When a QID (say for connection i) has been taken from the sort queue and forwarded to the scheduler shown in FIG. 4 (this means the cell at the head of the FIFO will be transmitted in the next cell cycle) and there is a further cell in the FIFO then the time stamp associated with this FIFO is updated by TSi←TSi+Ti and a new QID with the new time stamp TSi is inserted into the sort queue.

When a cell for connection i arrives while its FIFO is empty (this means there is also no entry in the sort queue) then TSi is updated by TSi←VT+Ti and a QID with this time stamp is inserted into the sort queue.

There are various ways to implement the sort queue. Two proposals using a large amount of hardware are presented in J. W. Roberts, supra and H. J. Chao, 'A Novel Architecture for Queue Management in the ATM Network', IEEE JSAC, 9, (7), 1110–1118 (1991)'. In a preferred embodiment a method is used which is more suitable for high speed micro processor solutions. Details are presented below.

The generic cell scheduling function described above can be used to realize various fair scheduling algorithm. Important applications are described in the following.

Weighted Fair Queuing is a very attractive cell scheduling technique for ATM systems with large buffers. It allows to handle the different traffic classes defined by the ATM Forum (CBR; ABR, VBR-RT, VBR-NRT) in an integrated way within one node. However, in practice it is hardly possible to implement WFQ or PGPS as defined above. Virtual Spacing (J. W. Roberts, supra) (independently described in S. J. Golestani under the name self-clocked fair queuing) is a method to approximate these WFQ algorithms.

The Cell Scheduling function presented above performs Virtual Spacing if VT is updated each time when a QID is read from the sort queue by overwriting the value of VT with the new time stamp. With virtual spacing, cells are transmitted whenever the system is not empty. By definition the condition VT≧TSi, which has to be checked before a QID is given to the scheduler, is fulfilled whenever a cell is taken from the sort queue.

Virtual Spacing is fair in the sense that the transmission bandwidth is shared between the backlogged connections proportional to the values 1/Ti. However, Virtual Spacing has the disadvantage that it cannot strictly guarantee a minimum service rate for every connection.

For links between nodes with large buffers, Virtual Spacing is a very attractive cell scheduling technique. On interworking links interconnecting system with large buffers and systems with small buffers however, it is necessary to limit the peak cell rates of individual connections. This means Virtual Spacing is not adequate on these interworking links. Instead, a cell scheduling algorithm explicitly controlling peak cell rates is needed. The Virtual Spacing algorithm can be modified so that it allows a shaping of peak cell rates.

The basic idea behind Peak Cell Rate Shaping is the following: Select the cells for transmission in the same way as with Virtual Spacing but stop the cell transmission process when a policing device monitoring the connections' Peak Cell rates located at the egress of the output controller would detect non-conforming cells. For Peak Cell Rate Control the values Ti associated with the FIFO queues are defined by Ti=TPCR, i, where TPCR, i is the inverse of the Peak Cell Rate of connection i. The Virtual Time Control holds for every connection the parameters of a Generic Cell Rate Algorithm (GCRA) as defined in ATM Forum, supra—this means TPCR, i, (the virtual time control may use the value associated with the FIFO), τi, a value specifying the cell delay variation tolerance for connection i, and Xi, the current contents of the GCPA of connection i.

With these parameters the cell scheduling algorithm operates as follows: the variable VT always carries the value of the time stamp of the connection which has been served as the last one, this meaning that VT is updated each time when a QID is forwarded to the Scheduler. Before VT is updated and the QID (let us say for connection i) is given to the Scheduler, it is checked whether the respective GCRA held by the Virtual Time Control would overflow. If this would be the case, V keeps its old value and the QID with the lowest time stamp remains in the sort function up to the next cell cycle. Then it is checked again, whether the virtual time VT can be increased and the respective FIFO queue can be served. This procedure guarantees that the peak cell rate of every connection is guaranteed.

In the special case τi=0 it is guaranteed that the minimum interdeparture time PCr,i is never violated. However, this extreme requirement may lead to a reduced load on the outgoing link. In particular, it is not possible to guarantee a minimum cell interdeparture time of TPCR for CBR connections which have accumulated some cell delay variation and are sending at their peak cell rate 1/TPCR. If a CBR connection were shaped in this way the queue would grow and become unstable.

During periods of burst level congestion, connections are served at a rate below their Peak Cell Rate. The choice of the values Ti as PCr,i insures fairness in the sense that the connections are served in proportion to their peak cell rates.

Above it was explained that loss-free statistical multiplexing of VBR-NRT traffic can be achieved when each connection everywhere in the network is served at least at its Sustainable Cell Rate. The cell scheduling algorithm described serves connections proportionally to their Peak Cell Rates. This property can be used to guarantee a minimum service rate of (approximately) the Sustainable Cell Rate under two conditions.

a) Peak Cell Rate Reservation is applied. Then each connection obviously gets a service rate equal or greater than the Sustainable Cell Rate. In this case, no statistical multiplexing gain is achieved on an interworking link between a system with large buffers and small buffers.

b) Bandwidth equal to BWi=PCRi/Bmin, where Bmin= min j {PCRj/SCRj} is the smallest burstiness factor of the connections on the link, is reserved for connection i. With this approach a statistical multiplexing gain of up to Bmin can be achieved. With this approach, a statistical multiplexing gain of up to Bmin can be achieved.

For efficient support of VBR-NRT traffic it is important to have a Cell Scheduling function which can strictly guarantee that every connection is always served at least at its Sustainable Cell Rate (see above). Virtual Spacing has the drawback that it achieves this objective only approximately, which may be a problem for connections with real time requirements (compare J. W. Roberts). However, this requirement is fulfilled exactly if the values Ti are defined as the inverse of the connections' sustainable cell rates and the virtual time VT presents the system time and evolves with a constant rate. The resulting algorithm is very similar to the virtual clock algorithm described in L. Zhang, supra.

There are various ways to implement sorting functions suitable for the task described above. Here a method used for a preferred embodiment is described. This method is less efficient than the method in J. W. Roberts and P. E. Bayer, supra, but is more suitable for high speed micro processor solutions. It sorts QIDs "approximately" in the following sense. A slotted system is considered. Each slot corresponds to a cell cycle of the outgoing link. Let tc denote the length of a cell cycle. E.g. for an STM-1 link with a capacity of 155 Mb/s tc has a length of 2.83 µs. The sort queue only sorts the time stamps within an accuracy given by the cell cycle length. QIDs with time stamps belonging to the same cell cycle of the outgoing link leave the system on a FIFO basis.

Figure 5:
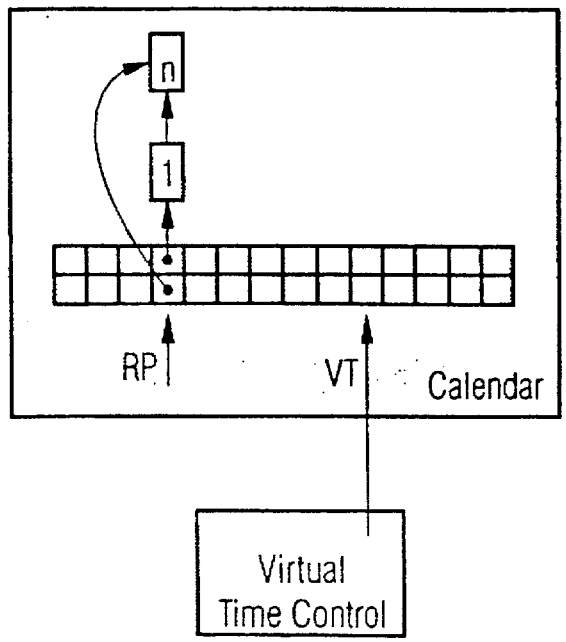
FIG. 5 illustrates Virtual Time Control working closely with a calendar mechanism for replacement of a sort queue in FIG. 4.

FIG. 5 shows the Virtual Time Control which works closely together with a calendar mechanism which would replace the sort queue in FIG. 4.

An array denoted as calendar is used to sort QIDs according to related time stamps. Every calendar entry has two parts, (the Calendar Entry head and the Calendar Entry Tail) for every cell cycle of the (near) future. Calendar entries are used to link QIDs to a calendar position. A QID is inserted into the sort queue by linking it to calendar position $P:=\lfloor x/tc \rfloor$ when it carries a time stamp x. If there are more than one QID to be linked to the same calendar position, the respective QIDs are linked to the calendar forming a linked list.

QIDs are read from the calendar with the aid of a variable RP (Read Position) which identifies the position of the calendar holding the QIDs with the smallest time stamps. RP always points to the QID which will leave the sort queue as the next one. When a QID has been forwarded to the cell scheduler and the respective linked list of QIDs has become empty, RP is incremented to point to the next non-empty calendar entry. It may happen that RP has to search through many calendar entries to find the next non-empty calendar slot. The average number of slots RP has to search through depends very much on the application for which the cell scheduling algorithm is used. Efficient search procedures are needed in particular for virtual spacing where on the average the read pointer moves with a speed proportional to the inverse of the sum of the rate parameters of all backlogged connections.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for scheduling message cells leaving an ATM node and belonging to virtual connections by means of an output controller allocated to each of outputs of the ATM node, comprising the steps of:

storing message cells to be transmitted via a respective output in connection individual FIFO-queues;

allocating two variables Ti, TSi to each of the FIFO-queues, where Ti defines a distance between consecutive message cells of a virtual connection i served at a rate ri=1/Ti, and TSi denotes a time stamp for a message cell at a head of a FIFO-queue i;

providing a virtual time variable VT;

monitoring peak cell rate individually for each of the virtual connections at an egress of the respective output controller;

serving the FIFO-queue with a lowest time stamp for transmitting the message cell at the head of that FIFO-queue only when VT≧TSi and the peak cell rate for the respective virtual connection is not exceeded; and updating the time stamp for the FIFO-queue if it is not empty with TSi←TSi+Ti after transmitting said message cell.

* * * * *